US012483188B2

(12) United States Patent
Singh

(10) Patent No.: US 12,483,188 B2
(45) Date of Patent: *Nov. 25, 2025

(54) ELECTRICAL BUS SYSTEM AND COMPONENTS

(71) Applicant: Wind Turbine & Energy Cables, Corp., Hasbrouck Heights, NJ (US)

(72) Inventor: Orin B. Singh, Essex Fells, NJ (US)

(73) Assignee: Wind Turbine & Energy Cables, Corp., Hasbrouck Heights, NJ (US)

( * ) Notice: Subject to any disclaimer, the term of this patent is extended or adjusted under 35 U.S.C. 154(b) by 239 days.

This patent is subject to a terminal disclaimer.

(21) Appl. No.: 18/494,329

(22) Filed: Oct. 25, 2023

(65) Prior Publication Data

US 2024/0136974 A1 Apr. 25, 2024
US 2024/0235469 A9 Jul. 11, 2024

Related U.S. Application Data

(60) Provisional application No. 63/419,069, filed on Oct. 25, 2022.

(51) Int. Cl.
*H02B 1/20* (2006.01)
*H02S 40/34* (2014.01)

(52) U.S. Cl.
CPC ............. *H02S 40/34* (2014.12); *H02B 1/20* (2013.01)

(58) Field of Classification Search
CPC .................................. H02S 40/34; H02B 1/20
USPC ......................................................... 361/637
See application file for complete search history.

(56) References Cited

U.S. PATENT DOCUMENTS

| | | | |
|---|---|---|---|
| 3,085,223 A * | 4/1963 | Toedtman | H01R 4/40 439/781 |
| 4,461,521 A * | 7/1984 | Sachs | H01R 4/646 174/44 |
| 8,408,929 B2 | 4/2013 | Solon | |
| 8,604,342 B2 | 12/2013 | Solon | |
| 8,937,249 B2 | 1/2015 | Solon | |
| 9,553,225 B2 | 1/2017 | Ramsey | |
| 9,589,752 B2 | 3/2017 | Solon | |
| 9,622,454 B2 * | 4/2017 | Bishop | H01H 85/1755 |
| 9,800,028 B1 * | 10/2017 | Smith | H02G 3/0443 |
| 10,063,039 B2 * | 8/2018 | Smith | H02G 3/0443 |
| 10,192,706 B2 | 1/2019 | Solon et al. | |

(Continued)

FOREIGN PATENT DOCUMENTS

WO 2016025538 A1 2/2016

*Primary Examiner* — Anatoly Vortman
(74) *Attorney, Agent, or Firm* — Jeffrey B. Fabian; Shumaker, Loop & Kendrick, LLP

(57) ABSTRACT

An electrical bus system has an integrated trunk bus that includes at least one positive bus line, an equal number of negative bus line, and a messenger cable that that are twisted together to form a single, integrated trunk bus line. The messenger cable provides mechanical support and is coupled to vertical support using brackets, ground clamps, or other suitable coupling techniques, thereby eliminating the need for cable hangers or trenching. The messenger cable provides a grounding function, thereby eliminating the need for an additional grounding line. Multi-tap shear bolt connectors are used to connect the integrated trunk bus line to photovoltaic wires carrying the output from one or more solar panel arrays, thereby obviating the need for combiner boxes used in conventional systems.

20 Claims, 16 Drawing Sheets

(56) References Cited

U.S. PATENT DOCUMENTS

| | | | |
|---|---|---|---|
| 10,594,075 B2 | 3/2020 | Yaroslavskiy | |
| 10,992,254 B2 | 4/2021 | Solon | |
| 11,437,790 B2* | 9/2022 | Smith | H02G 3/04 |
| 2012/0252258 A1* | 10/2012 | Solon | H01R 13/639 |
| | | | 439/445 |
| 2016/0072431 A1* | 3/2016 | Solon | H01R 4/70 |
| | | | 29/854 |
| 2016/0153587 A1* | 6/2016 | Smith | H02G 3/30 |
| | | | 29/515 |
| 2017/0025994 A1* | 1/2017 | Sader | H02S 40/34 |
| 2018/0034252 A1* | 2/2018 | Smith | H02G 3/04 |
| 2018/0233888 A1* | 8/2018 | Smith | F16L 3/223 |
| 2022/0038046 A1* | 2/2022 | Wedding | H02G 3/30 |
| 2022/0190577 A1* | 6/2022 | Worden | H02G 3/28 |
| 2022/0255300 A1* | 8/2022 | Rand | H02G 3/0456 |
| 2022/0356963 A1* | 11/2022 | Michael | H01B 7/0045 |
| 2023/0027228 A1* | 1/2023 | Ge | H02G 15/08 |
| 2023/0074764 A1* | 3/2023 | Smith | H02G 3/30 |
| 2023/0336118 A1* | 10/2023 | Solon | H02S 40/30 |
| 2024/0364259 A1* | 10/2024 | He | H01R 31/02 |
| 2025/0125556 A1* | 4/2025 | Elmes | H01R 13/527 |

* cited by examiner

ELECTRICAL BUS SYSTEM AND COMPONENTS

TECHNICAL FIELD AND BACKGROUND

The present invention relates generally to electrical bus systems, and more particularly, to an electrical bus system that interconnects arrays of solar power generation units.

Conventional solar power generation systems feed the output current from numerous solar panel arrays to combiner boxes. Electrical buses carry the current from combiner boxes to a centralized power system and in some cases, carry current from the solar panel arrays to the combiner boxes. Combiner boxes are prone to overheating and failure even from relatively small losses at the numerous connection points and the accompanying high currents, and combiner boxes are difficult to safely service and replace. Conventional electrical bus lines connecting the combiner boxes also suffer from disadvantageous that include high material costs and significant labor required to install the bus systems. Electrical bus systems are generally buried in trenches, which require heavy machinery to create, or hung using hundreds of hanger components that must be coupled to the electrical bus.

Given the foregoing drawbacks of conventional systems for electrically interconnecting solar panel arrays, it is an object of the present invention to provide electrical bus systems that eliminate the need for combiner boxes and that are less expensive and more efficient to install. The bus systems disclosed herein include an integrated bus that pairs multiple bus lines together through twisting and that wraps the integrated bus line around a spool to facilitate installation.

The integrated bus disclosed in this application includes a messenger cable that provides mechanical support and that is used to couple the bus to vertical supports for installation without the need for hangers that are labor intensive to install. In particular, the integrated trunk bus can be hung from a hardware-less bracket, which provides continuity of the ground circuit, and that can be installed into a slot without the need for tooling or hardware. The positive and negative bus lines can be formed from a ruggedized cable construction suitable for both low voltage and high voltage applications. The integrated bus line is coupled to photovoltaic wires coming from the solar panel arrays using a multi-tap shear bolt connector that obviate the need for combiner boxes and that show favorable temperature performance compared to combiner boxes.

SUMMARY

In one embodiment of the electrical bus system, a plurality of vertical supports are arranged in a row where each vertical support is proximal to at least one power generation unit, such as one or more solar panel arrays. An integrated trunk bus extends between the vertical supports. The integrated trunk bus has a positive bus line, a negative bus line, and a messenger cable line that are all are twisted together along the length of the lines. A bracket is fixed to each of the vertical supports, and the trunk bus is secured to the bracket at each vertical support.

The system includes a connector that has a housing formed as an elongated hollow body with an exterior surface, a first opening, a second opening, and a socket extending from the first opening to the second opening. The integrated trunk bus extends through the socket from the first opening to the second opening. The connector also has a plurality of passages that each extend from the exterior surface through the housing to the socket. Conductive fasteners, such as shear bolts, are inserted through the passages to frictionally engage the integrated trunk bus within the socket. The integrated trunk bus is in signal communication with the connector through the conductive fasteners when the fasteners pierce through insulation covering the trunk bus lines.

The connector, which can be a shear-bolt connector, also includes a plurality of taps that are each formed as a conduit that extends through the connector housing to the socket (i.e., the interior of the housing). A conductor line or wire is housed within each of the plurality of taps, and each conductor line is in signal communication with at least one of the electrical power generation units and the integrated trunk bus. The connector can be at least partially encased within an insulating material, such as a molded thermoplastic elastomer disposed on the connector by heat shrinking.

In another embodiment of the electrical bus system, each of the power generation units is a plurality of solar panel arrays that are in signal communication with a photovoltaic wire harness through photovoltaic wires. The conductor lines, which themselves can be photovoltaic wires, are connected to the photovoltaic harness. In this manner, the conductor lines coming from the taps in the connector place the connector in signal communication with the solar panel arrays, and in turn, the solar panel arrays are in signal communication with the trunk bus.

In one aspect of the system, the bracket has a T-shaped head, a neck, a planar body, and an aperture. The head and the neck extend through a slot in the vertical support to connect the bracket to the vertical support. The trunk bus is secured to the bracket by, for example, a fastener installed in the aperture, which clamps down on the integrated trunk bus. The trunk bus can also run through a clip such that tightening the fastener causes the clip to close and clamp the trunk bus. In yet other embodiments, a variation of the bracket can be used where the bracket includes a notch. The messenger cable runs through the notch of the bracket to secure the trunk bus to the vertical support.

The brackets and vertical supports can provide a grounding function, as discussed in more detail below. To provide a grounding function, the integrated trunk bus is placed in signal communication with the bracket that is fixed to each vertical support. The brackets and the vertical supports are made from a conductive material such that the integrated trunk bus is connected to ground through the bracket and the vertical support.

Also disclosed is a method for installing an electrical bus system that includes the step of providing a plurality of vertical supports extending upward from the ground. Each vertical support includes a slot formed on a sidewall surface. The system include brackets that each have a head and a planar body, and the planar body has a top surface and a bottom surface. The installation method includes connecting one of the brackets to each of the vertical supports by rotating the bracket so that the head is aligned with the slot, inserting the head through the slot, and rotating the bracket so that the planar body top side and bottom side are approximately parallel to the ground and the bracket head is locked into the vertical support slot.

The method further includes the step of creating an integrated trunk bus by twisting together a positive trunk bus line, a negative trunk bus line, and a messenger cable. The integrated trunk bus is spooled about a reel for convenient storage and transport. The integrated trunk bus is connected to the plurality of vertical supports by unspooling the integrated trunk bus from the reel and securing the integrated trunk bus to each bracket. This can be done using a threaded fastener and/or a clamp, as discussed above.

The integrated trunk bus is run through the housing of the conductive connector. The conductive connector is secured to the integrated trunk bus by running a conductive fastener through the conductive connector housing to frictionally engage the integrated trunk bus. When the conductive fastener penetrates an insulating material surrounding the trunk bus lines, the conductive connector is then placed in signal communication with the integrated trunk bus in part through the conductive fastener.

The conductive connector is placed in signal communication with a plurality of power generation units through conductor lines that extend from each of a plurality of taps formed in the connector housing. That is, the conductor lines, which can be photovoltaic wires, connect to the power generation units, such as solar panel arrays, through a photovoltaic wire harness or another suitable connector.

BRIEF DESCRIPTION OF THE FIGURES

Features, aspects, and advantages of the present invention are better understood when the following detailed description of the invention is read with reference to the accompanying figures, in which.

DETAILED DESCRIPTION

Figure 1:
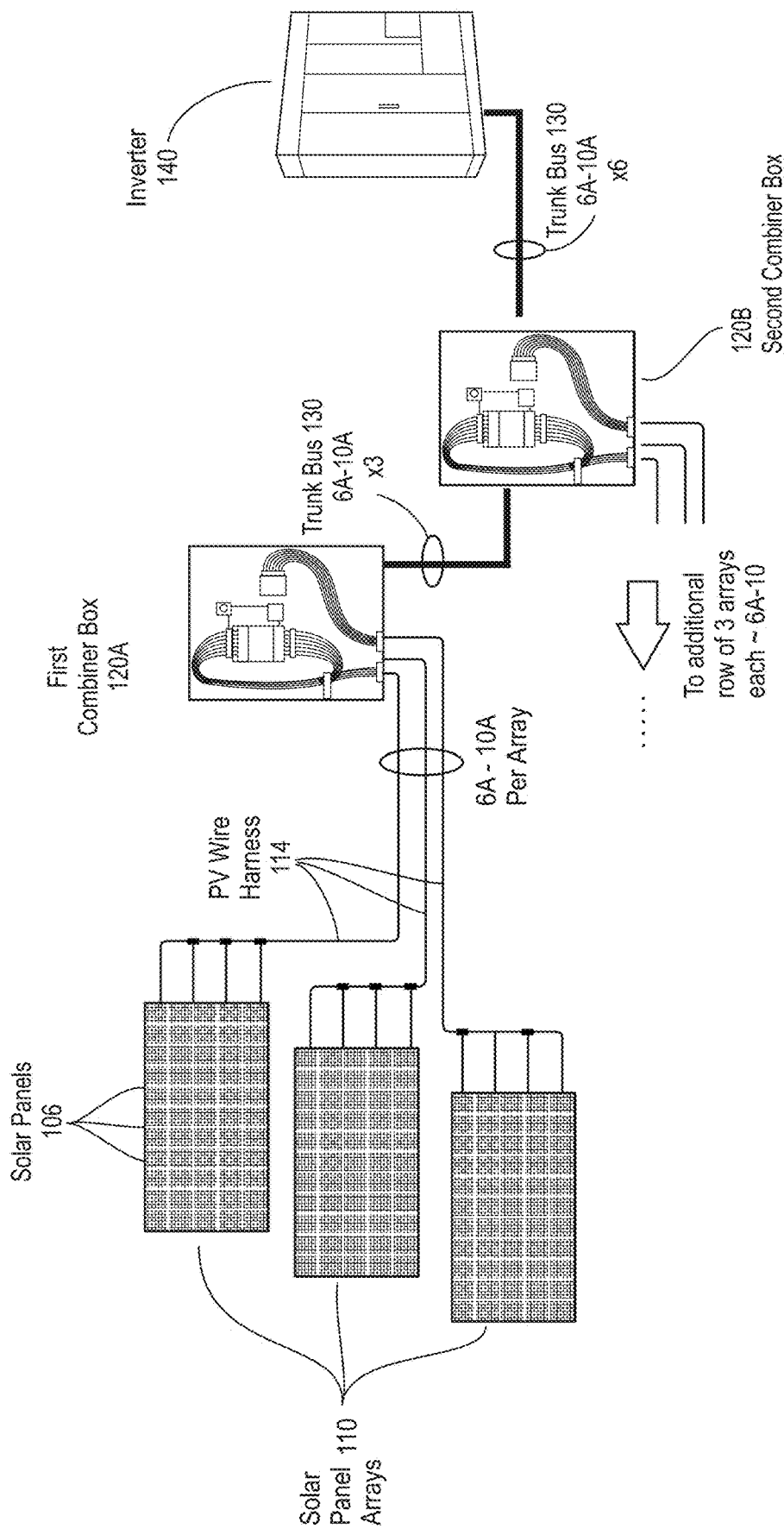
FIG. 1 illustrates a conventional configuration for interconnecting solar panel arrays.

The present invention will now be described more fully hereinafter with reference to the accompanying pictures in which example embodiments of the invention are shown. However, the invention may be embodied in many different forms and should not be construed as limited to the representative embodiments set forth herein. The example embodiments are provided so that this disclosure will be both thorough and complete and will fully convey the scope of the invention and enable one of ordinary skill in the art to make, use, and practice the invention.

Relative terms such as lower or bottom; upper or top; upward, outward, or downward; forward or backward; and vertical or horizontal may be used herein to describe one element's relationship to another element illustrated in the figures. It will be understood that relative terms are intended to encompass different orientations in addition to the orientation depicted in the drawings. By way of example, if a component in the drawings is turned over, elements described as being on the "bottom" of the other elements would then be oriented on "top" of the other elements. Relative terminology, such as "substantially" or "about," describe the specified materials, steps, parameters, or ranges as well as those that do not materially affect the basic and novel characteristics of the claimed inventions as whole (as would be appreciated by one of ordinary skill in the art).

Twisted, Integrated Bus System

Examples of conventional configurations for electrically interconnecting solar panel arrays are illustrated in FIGS. 1 through 4. The individual solar panels 106 are arranged into panel arrays 110. Each solar panel array 110 outputs approximately 6 A to 10 A of current through a photovoltaic ("PV") wire harness 114 that leads to a combiner box 120A & 120B. The current from each panel array 110 is combined within the combiner box 120A & 120B and fed to a trunk bus 130. The trunk bus 130 carries the combined current to an inverter 140 that connects to a local power grid.

Note that the example configurations shown in FIGS. 1-4 are illustrative and not intended to be limiting, and there are other potential configurations that can be improved using the inventive systems, components, and methods described in this specification. For instance, FIG. 1 shows three panel arrays 110 and corresponding PV wire harnesses 114 feeding combiner boxes 120A & 120B, but in some configuration there could be ten, twenty, or another predetermined number of solar panel arrays 110 connected to a combiner box 120A & 120B. Moreover, the PV wire harnesses 114 could be connected to an initial feeder bus that extends along a row of panels arrays 110. The feeder bus then connects the panel arrays 110 to the combiner boxes 120A & 120B and trunk bus 130, which is also known as a "home run" to the power station including the inverter 140. In those cases, both the trunk bus 130 and the initial feeder bus could be improved with the twisted, integrated bus 130 disclosed herein or the use of multi-tap connectors disclosed herein.

Figure 2:
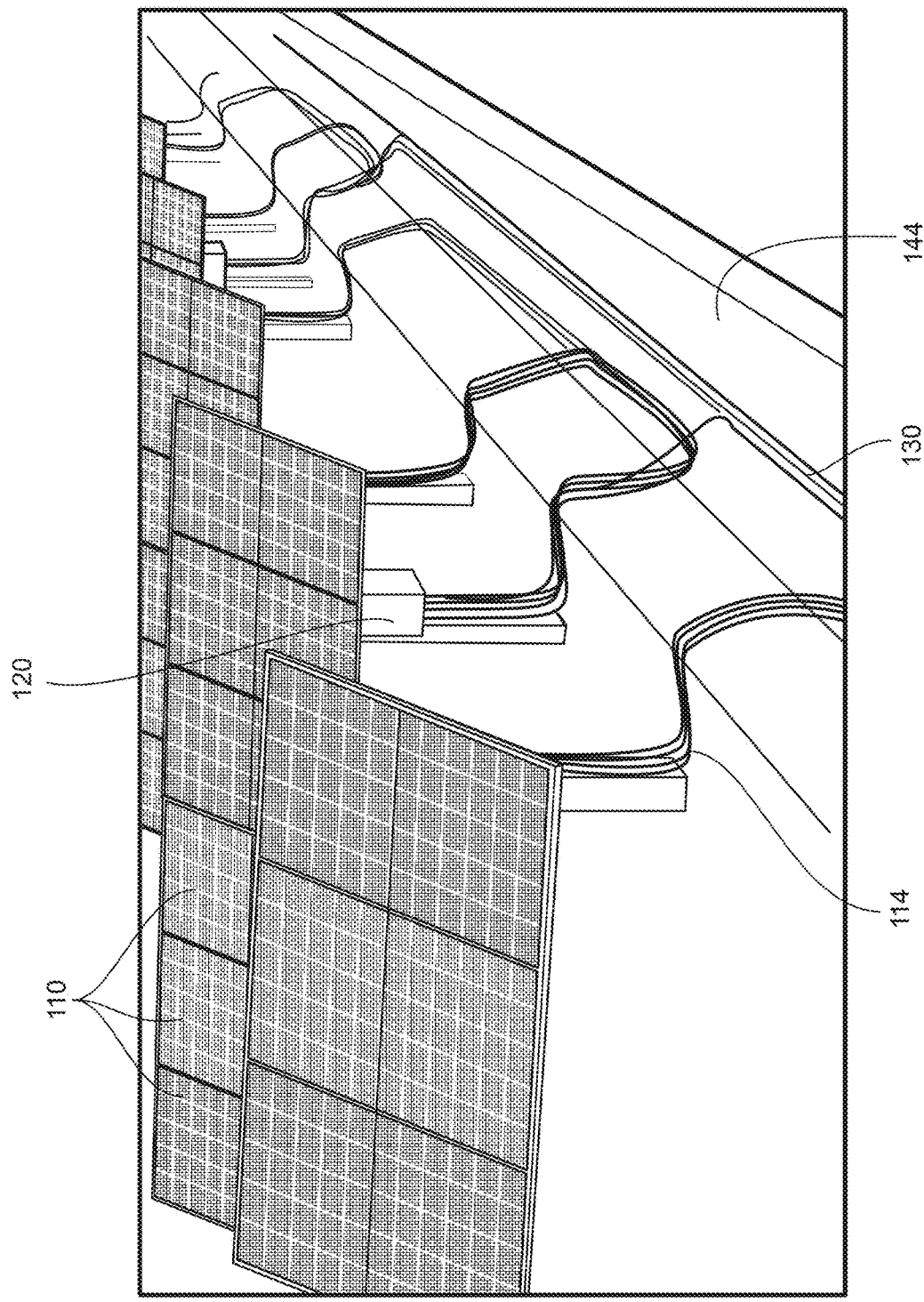
FIG. 2 illustrates trunk bus installation through trenching techniques.
Figure 3:
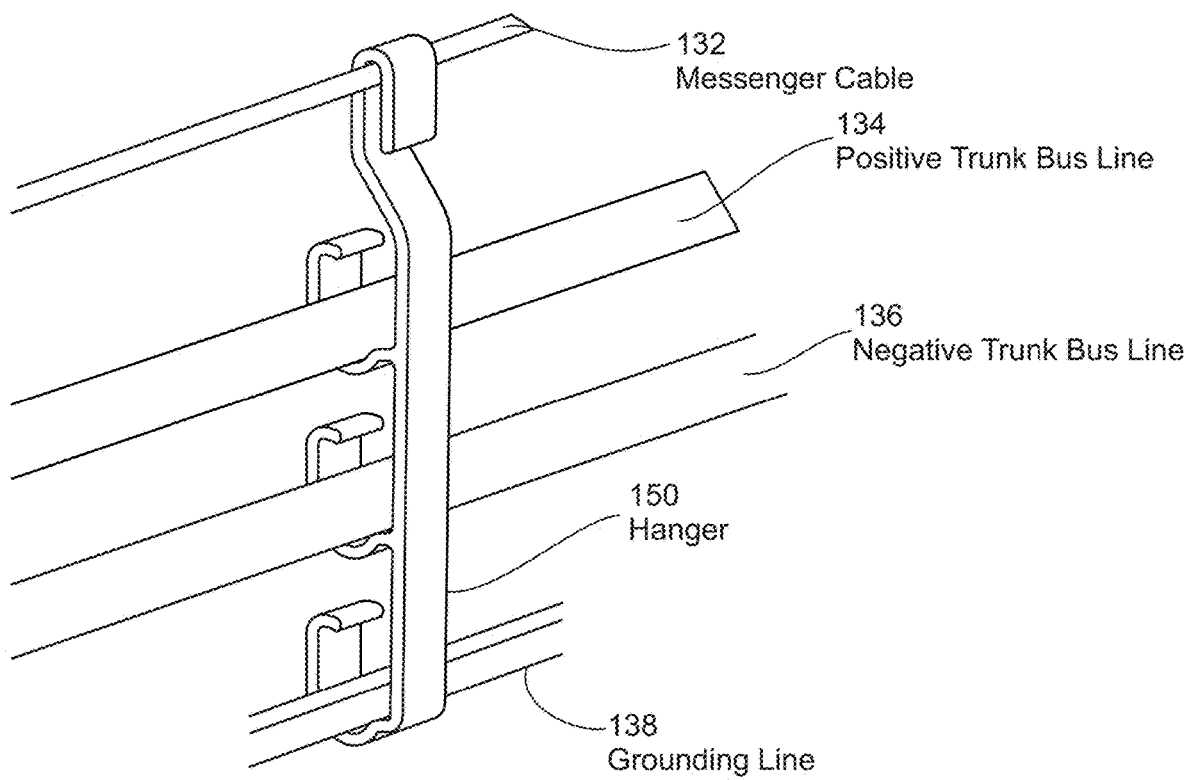
FIG. 3 illustrates a trunk bus hanger embodiment.

Turning again to FIGS. 1-4, the trunk bus 130 includes one or more conductor lines in combination with other lines that run in parallel and provide mechanical support and grounding protection. With reference to FIG. 3, the trunk bus 130 can include a positive trunk bus line 134 and a negative trunk bus line 136 made from available photovoltaic cable. The positive trunk bus line 134 and negative trunk bus line 136 can be formed as electrically conductive stranded cables surrounded by one or more insulating layers. For higher amperage applications, the positive and negative trunk bus lines 134 & 136 are formed as bus bars. The positive and negative trunk bus lines 134 & 136 are optionally housed within the same or within separate conduits (i.e., a hollow plastic or metal tube that houses the bus lines) for mechanical stability and protection against weather elements.

In one embodiment, the positive trunk bus line 134 and negative trunk bus line 136 are each made with a SolarTough® ruggedized cable. The SolarTough ruggedized cable includes a conductive cable surrounded by a first insulation layer of cross-linked polyethylene. The first insulating layer is between 5 mils to 15 mils in thickness and preferably approximately 10 mils in thickness (i.e., 10 one-thousandths of an inch). The first insulation layer is itself surrounded by a second insulation layer of high-density polyethylene. The second insulation layer is between 20 mils to 30 mils in thickness and preferably approximately 25 mils in thickness. The SolarTough cable works both for low voltage applications (i.e., about 600V) as well as high-voltage solar applications of about 2000V.

The SolarTough cable is manufactured using a specially designed extrusion head that creates a curable product, which meets the UL specification 4703. The high density polyethylene ("HDPE") compound is extruded simultaneously over a pure non-colored cross-linked polyethylene ("XLPE") material. This creates a jacket where both layers are fully cross-linked resulting in significantly tougher jacket with superior surface abrasion resistance as well as color fastness in the outer layer. The lack of color particles (particularly red) in the inner insulation layer means the phenomenon of porosity, which is normally seen with red color particles mixed throughout the insulation, is no longer created. This leads to longer life and more reliable insulation of the conductor. Those of skill in the art will appreciate that the example construction is not intended to be limiting, and other suitable thicknesses and insulators could be used that are capable of withstanding high-voltage applications.

The trunk bus 130 can also include a messenger cable 132 that provides mechanical stability and serves as a "backbone" along the length of the trunk bus 130. Additionally, the trunk bus 130 can be formed with a grounding line 138 that electrically connects to each of the combiner boxes to protect against instances where a grounded combiner box becomes inadvertently energized.

Turning again to FIG. 1, multiple combiner boxes 120A & 120B may be connected in series along the trunk bus 130 such that the current becomes increasing larger across each combiner box 120A & 120B nearing the inverter 140. To illustrate with reference to the simplified example configuration shown in FIG. 1, the first combiner box 120A accepts input from three solar panel arrays 110 that each have an current output of 6 A-10 A. Assuming for the sake of illustration that each panel array 110 has an output of 10 A at 600 volts direct current ("VDC"). The output of the first combiner box 120A to the trunk bus 130 is then 30 A at 600 VDC. If a second row of three panel arrays (not shown) is connected to the second combiner box 120B, then the output at the second combiner box 120B is 60 A at 600 VDC. Thus, the current and power output, which is proportional to current (i.e., Power=Current×Voltage), are both doubled at the output of the second combiner box 120B.

Figure 4:
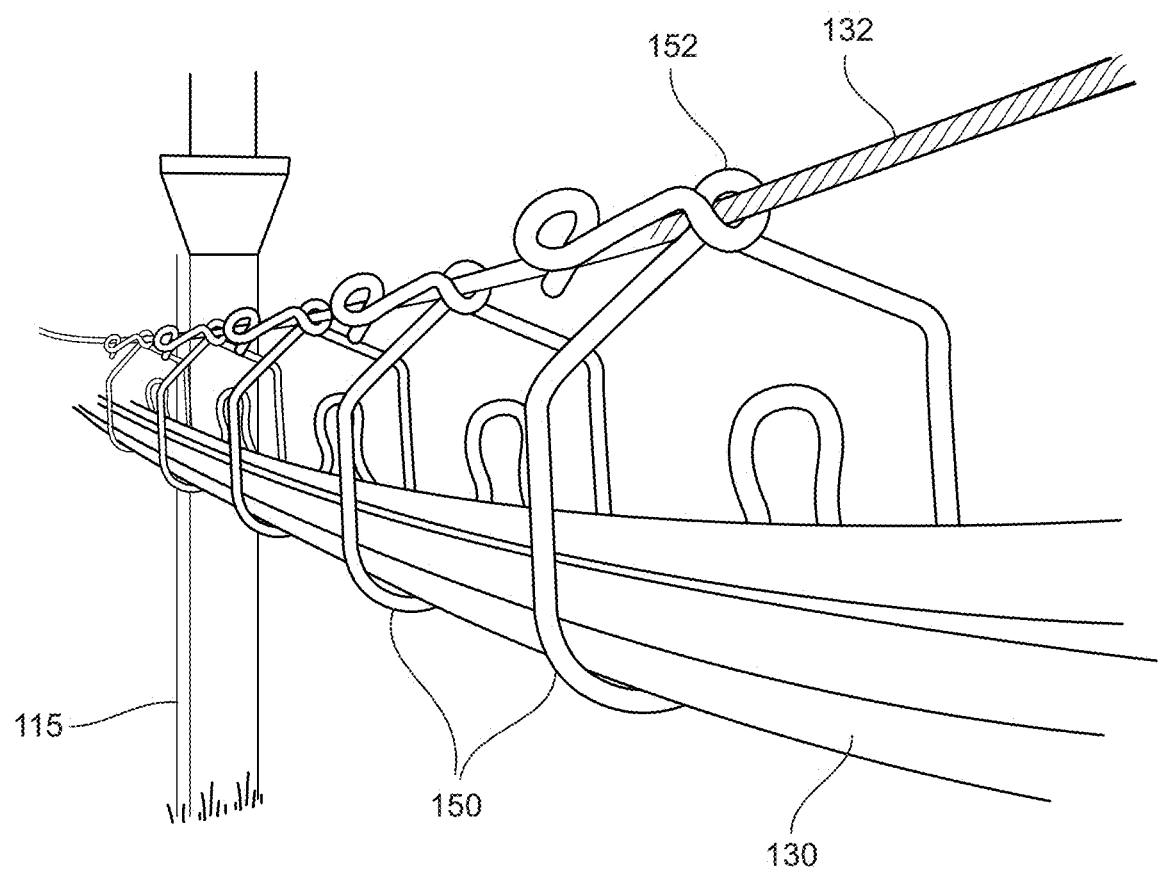
FIG. 4 illustrates a trunk bus hanger embodiment.
Figure 5:
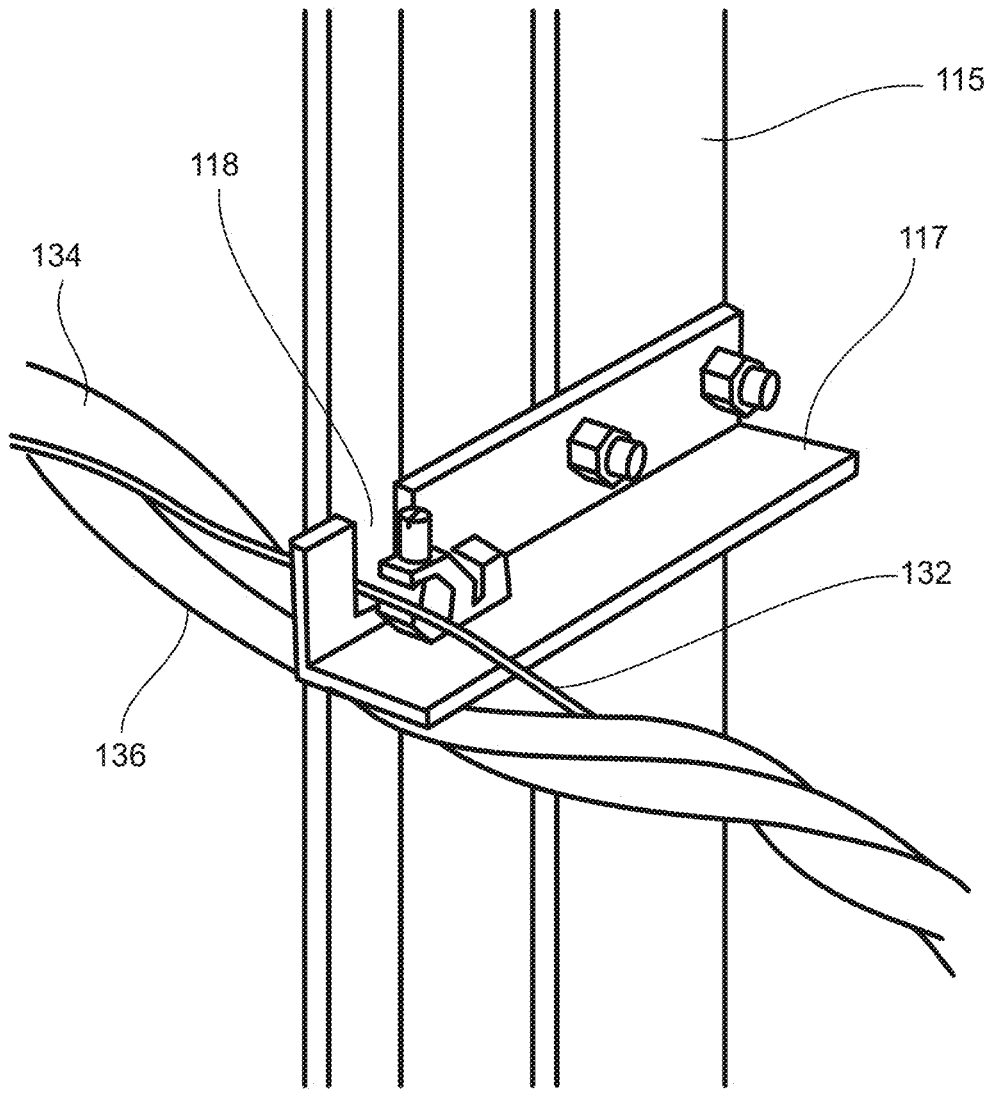
FIG. 5 depicts installation of an integrated trunk bus using a bracket according to one embodiment of the disclosed bus system.

The increasing current at the output of each combiner box leads to combiner box overheating and failure and limits the number of solar panel arrays that can be connected along a trunk bus. Combiner boxes are difficult to service safely because of the larger currents handled, and connection points within the combiner boxes must be torqued and otherwise installed precisely to avoid current loss that leads to overheating. Moreover, the increasing current requires larger conductor sizes for the trunk bus that can become challenging and costly to install. FIGS. 2-4 depict two conventional techniques for installing a trunk bus, including trenching (FIG. 2) and hanger suspension (FIGS. 3-4).

As illustrated in FIG. 2, trenching techniques entail burying the trunk bus 130 within a trench 144 created proximal to rows of solar panel arrays 110. Disadvantages of trenching techniques include the need for heavy equipment to form the trench 144 and the difficulty of repairing or servicing the trunk bus 130 after it has been buried.

The trunk bus 130 can also be installed above ground using hanger suspension techniques that rely on hangers 150 to couple the trunk bus 130 to the messenger cable 132. The messenger cable 132 provides mechanical support to suspend the trunk bus 130. The messenger cable 132 itself is affixed to vertical supports 115 that can be the same or different from the supports used to hold the solar panel arrays 110. Example hanger 150 embodiments are illustrated in FIGS. 3 and 4.

Hanger installation techniques offer advantages that include the ability to access the trunk bus 130 for servicing and repair. However, solar field systems may require thousands of hangers 150 that must be installed in close proximity to one another (e.g., every 18 inches) to support the substantial lengths and weights of trunk buses 130. Installing the hangers 150 requires running the various trunk bus 130 lines through each individual hanger 150, and in some cases, each hanger 150 must be bent or twisted to create a closed loop 152, such as the example hangers shown in FIG. 4. Given the substantial number of hangers 150 required and the significant labor involved with installing each hanger 150, the use of hanger installation techniques can involve substantial material costs and labor costs.

The present twisted low voltage system shown in FIGS. 5, 6A-6C, 7A-7B, 8, and 9 obviates the material costs and labor required to install hanger systems by integrating the messenger wire 132 with the positive and negative trunk bus lines 134 & 136 and coupling the integrated trunk bus 130 lines to vertical supports 115. More specifically, the messenger wire 132, at least one positive trunk bus line 134, and the same number of negative trunk bus lines 136 are twisted together thereby forming an integrated trunk bus 130.

The integrated trunk bus 130 is coupled to a vertical support 115 using brackets 117, 160, and 170 or other suitable coupling means that include, without limitation, hooks, turnbuckle tensioners, wire clamps, wire claps, or fasteners driven through the trunk bus 130. Conventional brackets, such as the elbow bracket shown in FIG. 7A, must be installed on a vertical support 115 using hardware that includes nuts, bolts, and washers, and the bracket utilizes a copper lug that accommodates the messenger wire 132. The trunk bus 130 is installed by seating the messenger wire 132 within the lug so that the messenger wire 132 supports the weight of the trunk bus 130. In another embodiment, the example bracket 117 shown in FIGS. 5 and 9 include a notch 118 that accommodates the messenger wire 132. The trunk bus 130 is installed by seating the messenger wire 132 within the notch 118 so that the messenger wire 132 supports the weight of the trunk bus 130.

In one example embodiment, the brackets 117, 160, or 170 are mounted to a vertical support 115 installed at each row of solar panels, or installed at a distance of every 18 to 25 feet apart, while still being able to accommodate the length and weight of the trunk bus 130. In other embodiments, the brackets 117, 160, or 170 are replaced with grounding clamps that securely couple the trunk bus 130 to vertical supports 115.

Figure 6A:
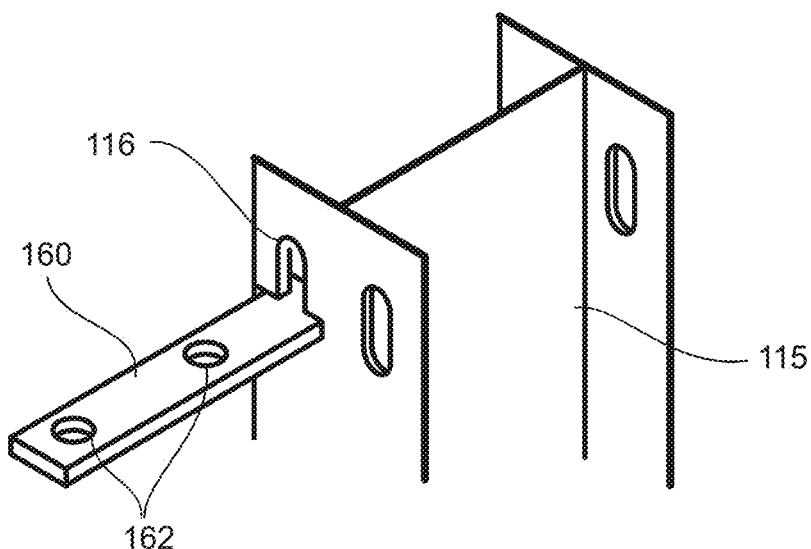
FIGS. 6A and 6B depict installation of an integrated trunk bus using a bracket according to one embodiment of the disclosed bus system.
Figure 6B:
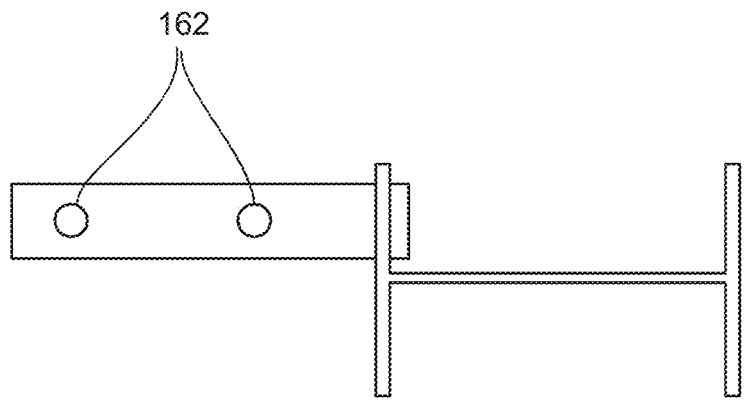
Figure 6C:
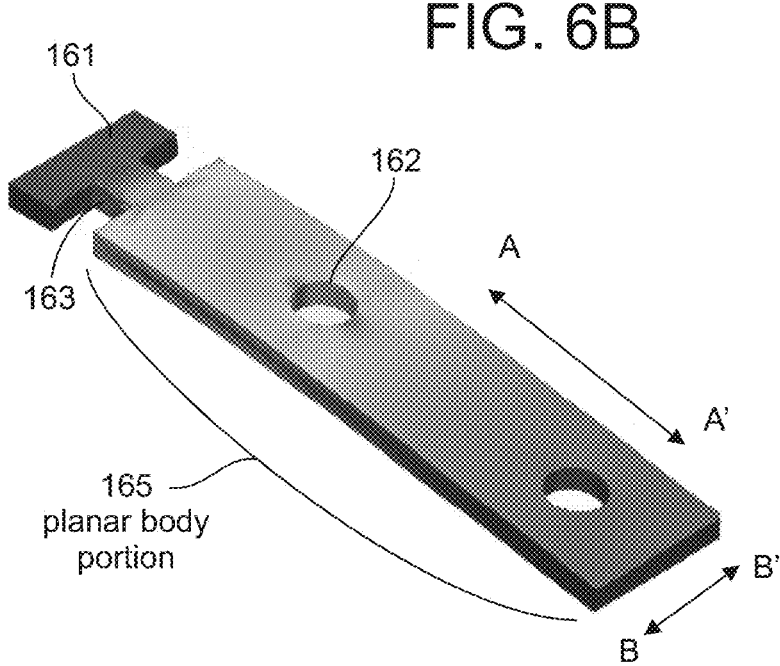
FIG. 6C depicts a trunk bus bracket according to one embodiment of the system.

One embodiment of the bracket 160 depicted in FIGS. 6A-6C includes a head 161 portion, a neck 163 portion, and a planar body portion 165 with apertures 162 disposed in the body portion 165. The body 165 is elongated with a top surface and a bottom surface such that the apertures 162 extend through the body from the top to the bottom surface. The body 165 has a first axis (A to A') extending from the head 161 along the length of the elongated body 165 and a second axis (B to B') extending across the width of the body.

In some embodiments, the width of the bracket (B to B') can vary across the length of the body 175 (A to A'). For instance, the body 165 can be formed with a larger width near the head 161 and neck 163 to provide additional rigidity and strength. The portion of the bracket 160 near the head 161 is secured to the vertical support 115 and becomes load bearing when an integrated trunk bus 130 is fixed to the bracket 160, and the additional width mitigates against bracket failure and lateral movement across the B-B' direction.

To install the bracket 160 to a vertical support 115, the bracket is rotated about the first axis such that the apertures are perpendicular to the ground. As illustrated in FIGS. 6A and 6B, the head 161 and neck 163 are inserted through a vertically aligned slot 116 in the vertical support 115, and the bracket 160 is rotated ninety degrees to lock the bracket 160 into place. The integrated trunk bus 130 is secured to the planar body 165 portion using a lug or a fastener, such as a bolt or screw, that is inserted through the aperture 162 and tightened to clamp down on the integrated trunk bus 130. In particular, the messenger wire 132 can be placed across the top of the body portion 165 within a clip, such as the clip 172 shown in FIG. 7A, and the clip can be clamped with a fastener to hold the messenger wire 132 and the remainder of the trunk bus 130 in place.

Figure 7A:
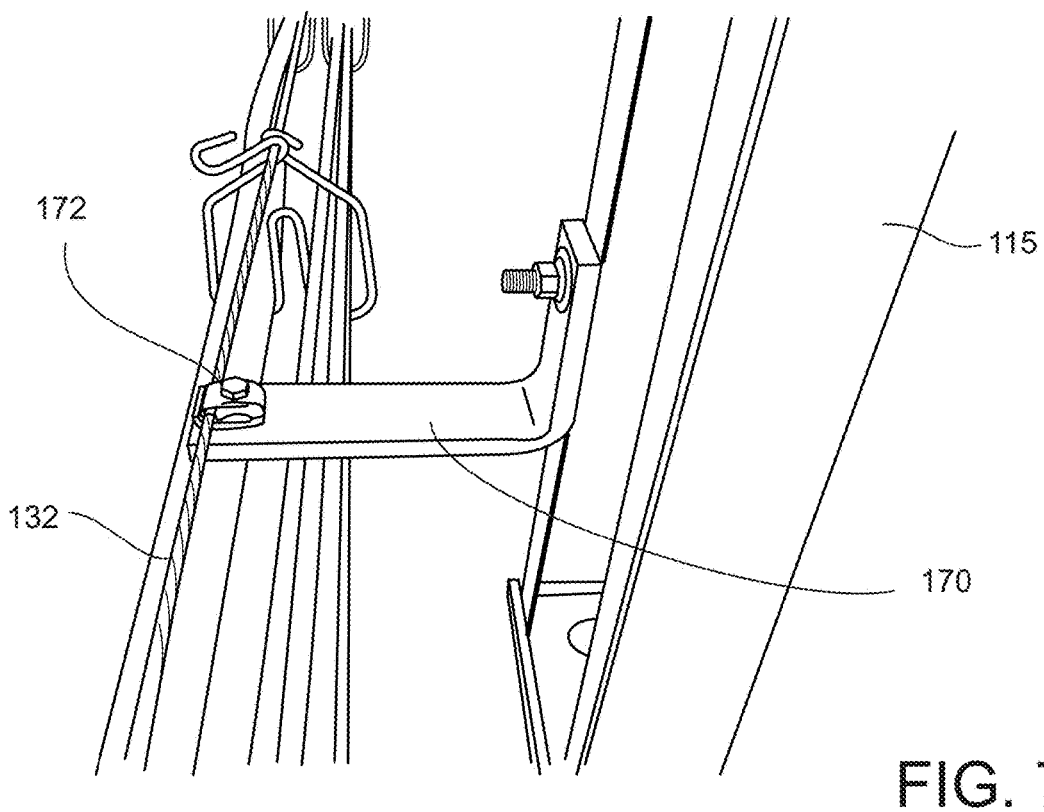
FIG. 7A depicts installation of an integrated trunk bus using a bracket according to one embodiment of the disclosed bus system.
Figure 7B:
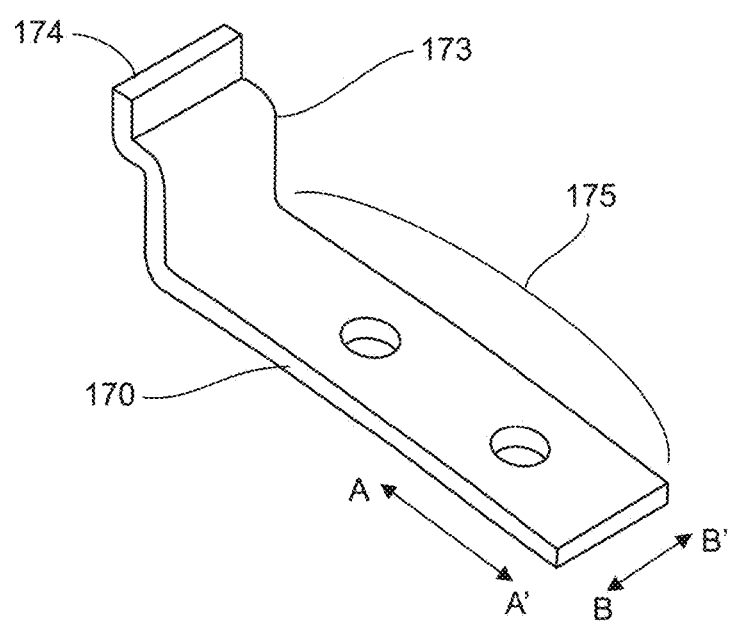
FIG. 7B depicts a trunk bus bracket according to one embodiment of the system

In another embodiment shown in FIGS. 7A and 7B, the bracket 170 is formed in approximately an "L-shape" with a planar body 175, apertures disposed in the body 175, a rabbeted portion 173, and a stem 174. To secure the bracket 170 to a vertical support 115, the body 175 is angled upward, the stem 174 is inserted through a vertically aligned slot in the vertical support 115 until the rabbeted portion 173 meets the slot edges, and the bracket 170 is rotated downward such that the body 175 is approximately parallel to the ground. The integrated trunk bus 130 is fixed to the body 170 using threaded fasteners and/or a clip, such as the clip 172 and fastener shown in FIG. 7A. In another embodiment, the bracket 170 is secured to the vertical support 115 using a fastener, such as screw or bolt, as depicted in FIG. 7A.

The brackets 160 & 170 shown in FIGS. 6A-6C and 7A-7B have the advantage that the brackets 160 & 170 can be secured to the vertical support 115 without using threaded fasters. Such installation is expedient and has no hardware cost, which provides substantial time savings and installation cost for systems where the brackets are installed a distance of every 18 to 25 feet. The brackets 160 & 170 can support up to four trunk bus lines 134 & 136 and two messenger cables 132.

The messenger cable 132, bracket (117, 160, & 170), and vertical support 115 can each be made of a conductive material so that the messenger cable 132 provides a grounding function. The messenger wire 132 can optionally be coated with copper to enhance conductivity. This potentially eliminates the need for a separate groundling line 138 and streamlines the number of components forming the trunk bus 130.

Figure 8:
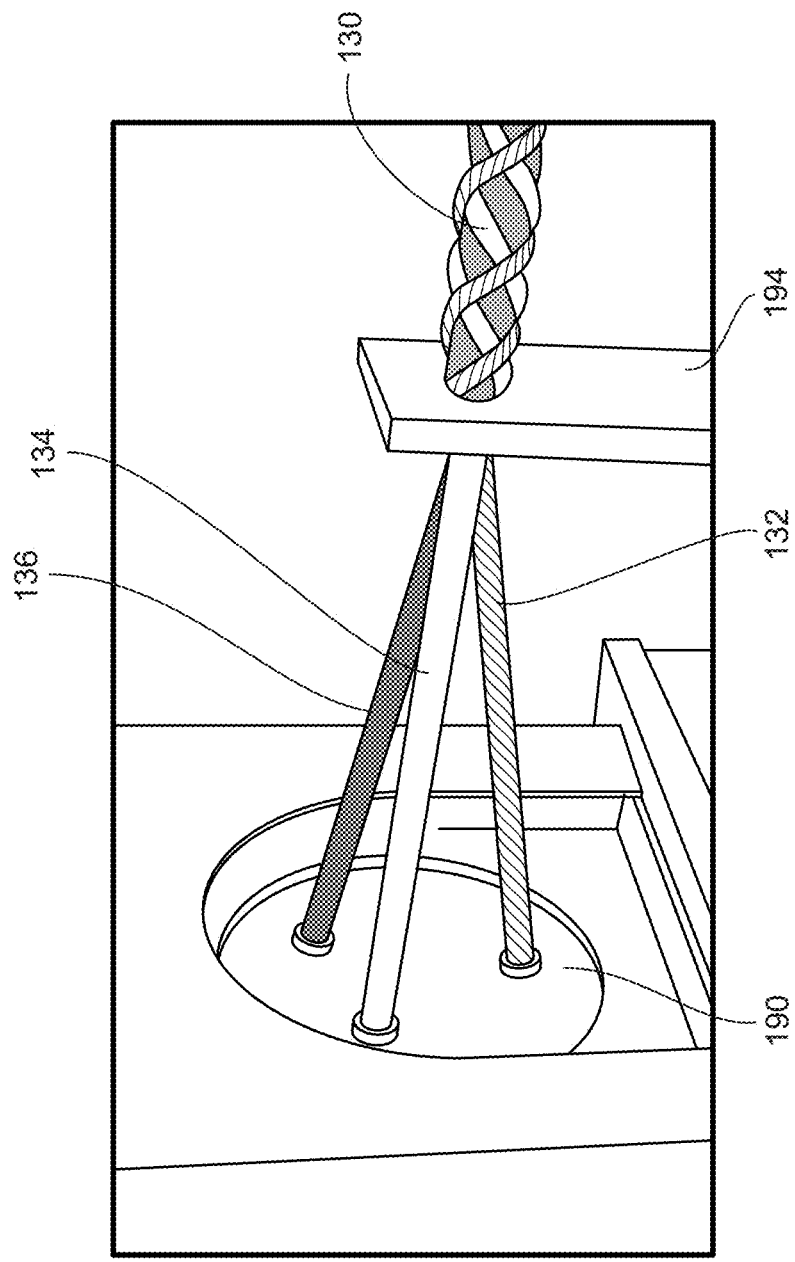
FIG. 8 illustrates assembly of an integrated trunk bus according to one embodiment.

The integrated trunk bus 130 can be formed prior to field installation using the example assembly apparatus shown in FIG. 8. A first end of the messenger cable 132, positive trunk bus line 134, and the negative trunk bus line 136 is fed through apertures on a rotating work piece 190. The three lines are also fed through a bundling guide 194, and then fixed at a second end (not shown). As the work piece 190 rotates, the bundling guide 194 translates horizontally, and the three trunk bus 130 components are twisted together, thereby forming an integrated, twisted trunk bus 130.

Figure 9:
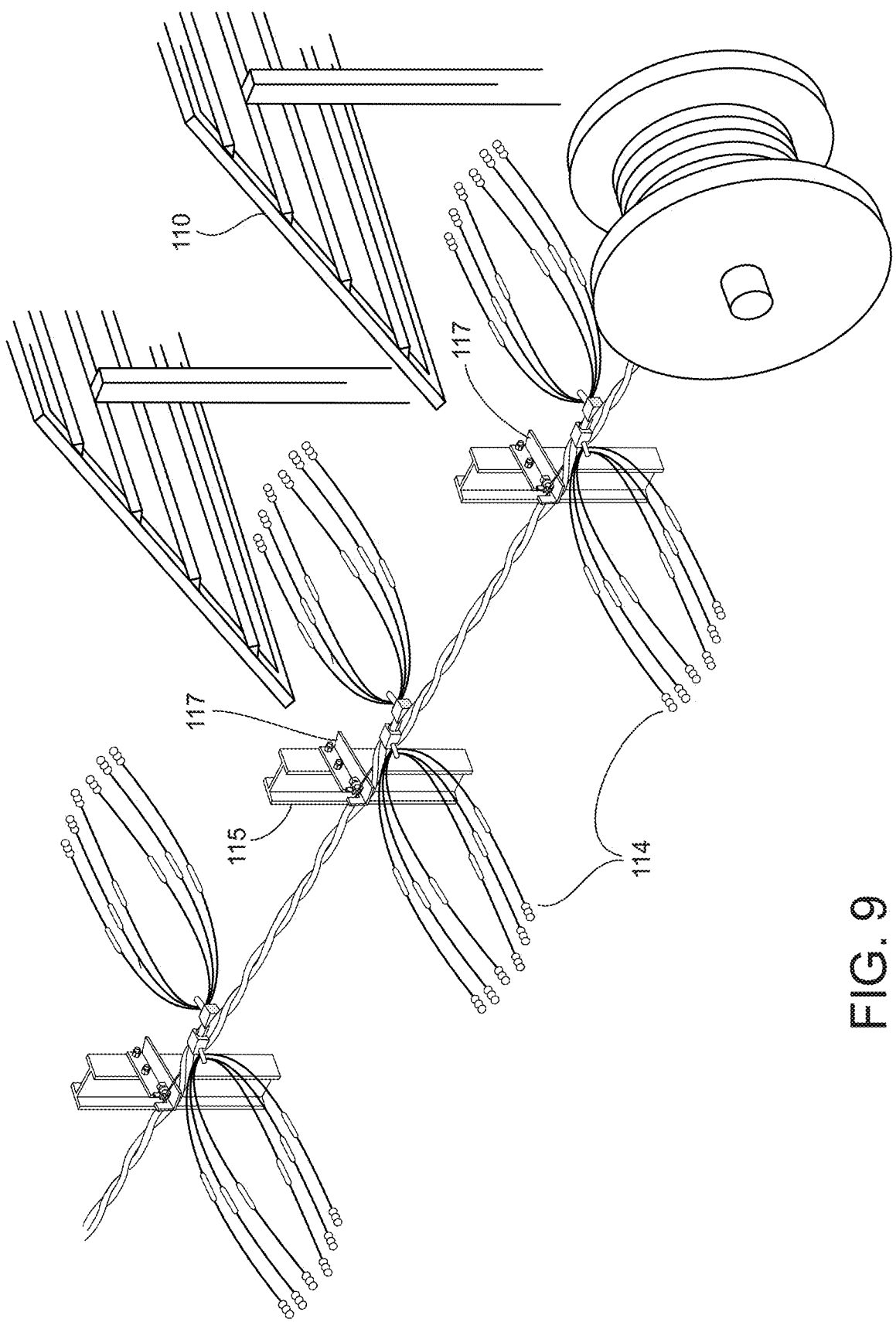
FIG. 9 illustrates an example trunk bus system according to one embodiment.
Figure 10:
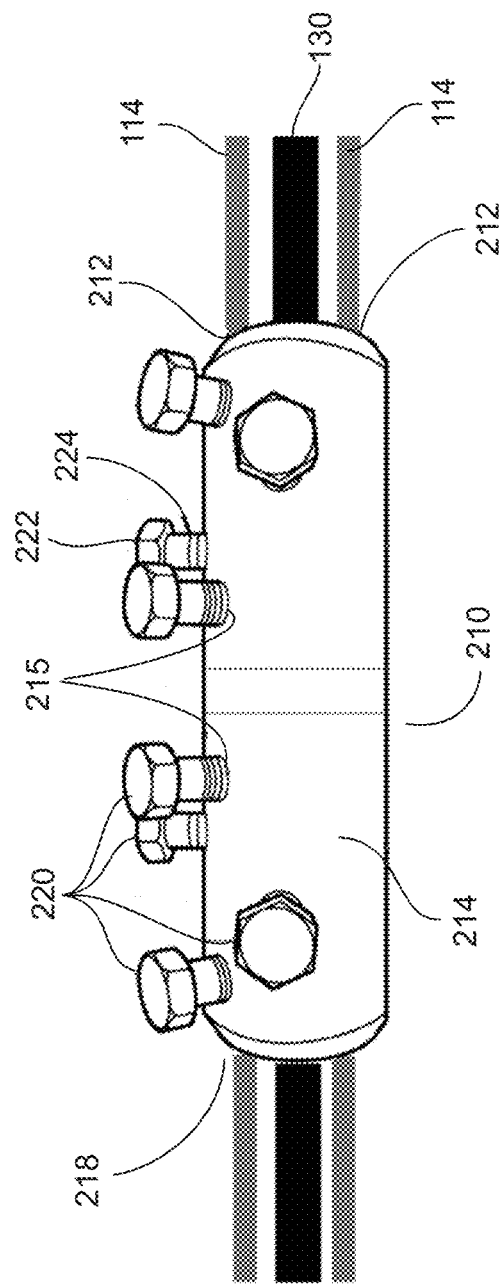
FIG. 10 is an example multi-tap connector according to one embodiment.
Figure 11:
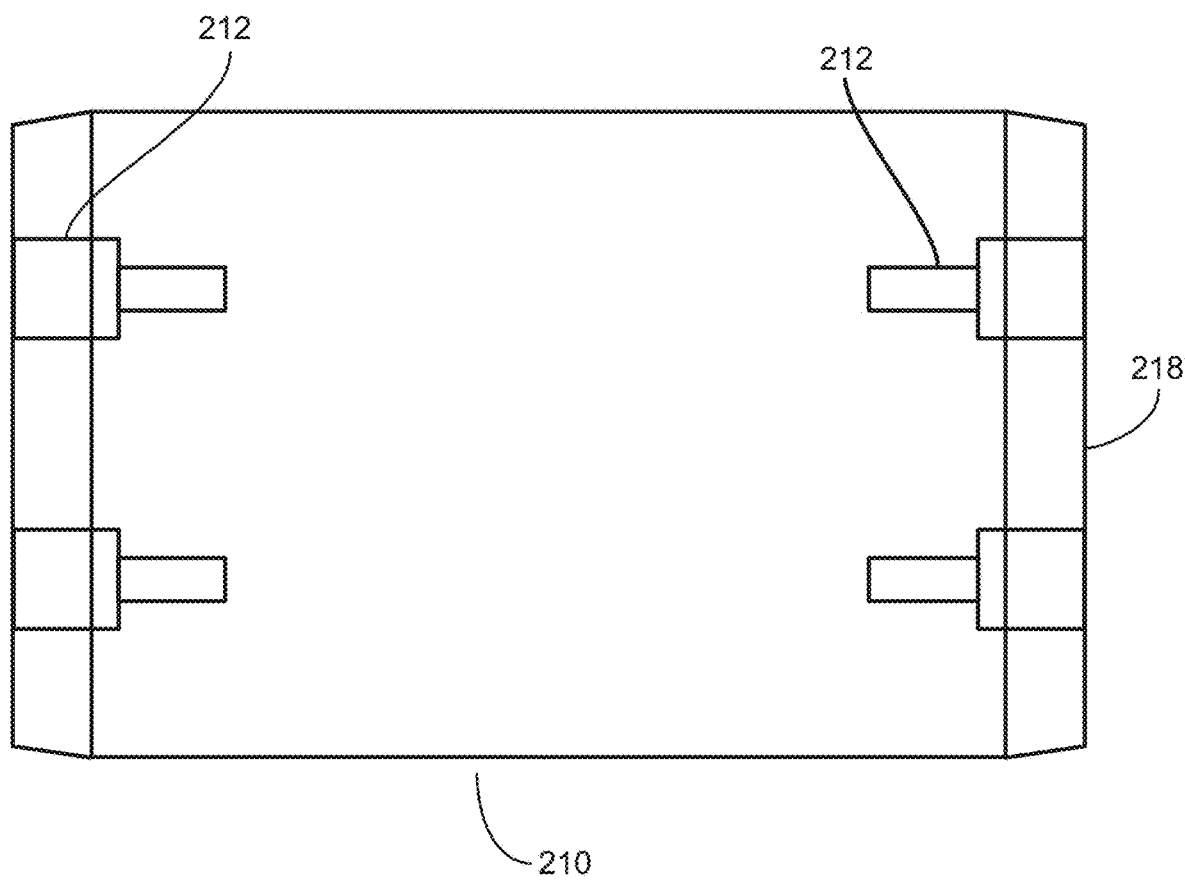
FIG. 11 is an example multi-tap connector according to one embodiment.
Figure 12:
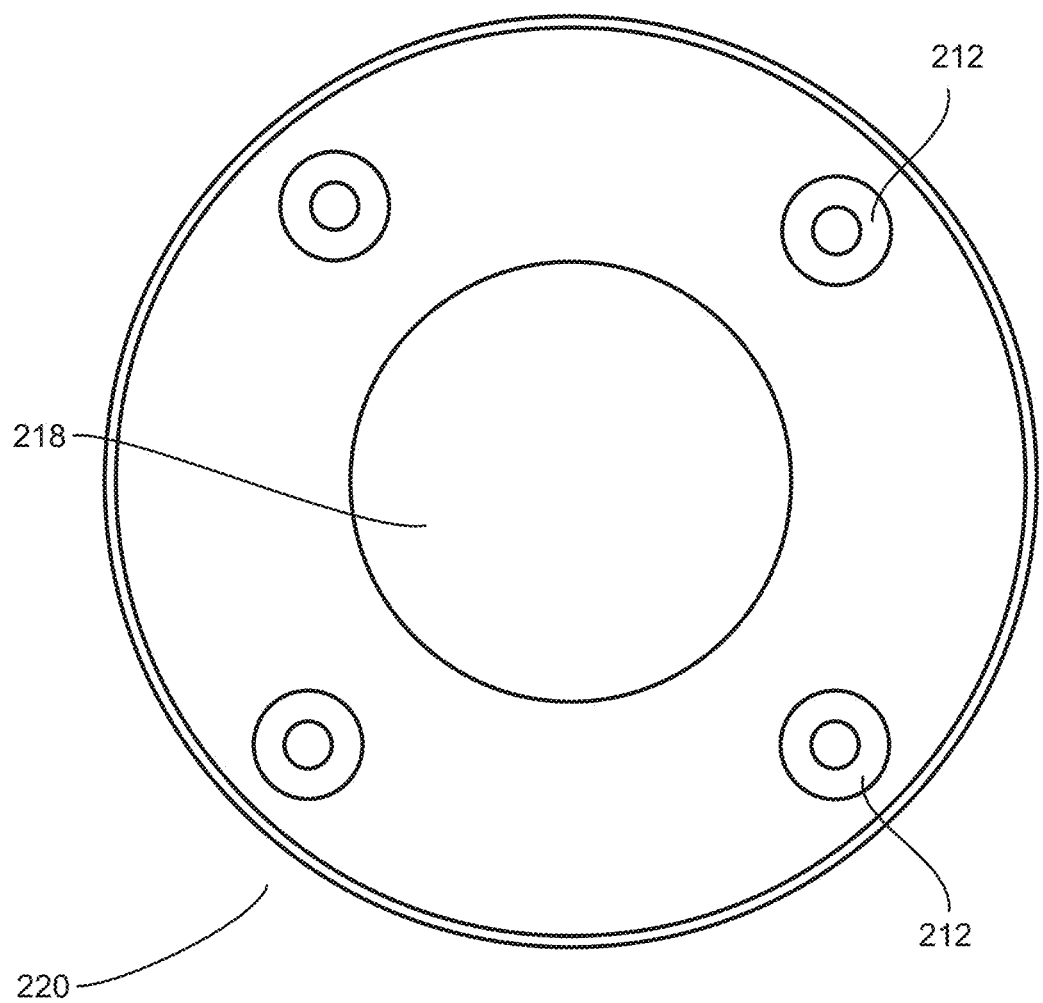
FIG. 12 is an example multi-tap connector according to one embodiment

The integrated trunk bus 130 is placed on a spool to further facilitate efficient field installation, as depicted in FIG. 9. The trunk bus 130 is conveniently installed by unspooling the integrated trunk bus 130 and placing the messenger cable 132 within the bracket notch 118. Thus, the trunk bus 130 installation is accomplished without the need to create a trench 144 or run the trunk bus 130 through numerous hangers 150 that must each be bent to form a closed loop 152.

In short, compared to traditional methods of trunk bus installation, the integrated trunk bus 130 disclosed in this specification takes substantially less labor and time to install and results in substantial savings in material costs by removing the need for hangers 150 and a separate grounding cable 138. More specifically, data gathered by Applicant to date shows that installation costs can be reduced by 25% to 50% using the integrated trunk bus 130 construction and installation techniques. In addition to "home run" trunk busses that connect to a centralized power system, the integrated trunk bus 130 and installation techniques disclosed herein can be applied to the construction of other types of electrical busses, including bus lines that connect individual panel arrays 110 or bus lines in other applications besides solar power generation.

Multi-Tap Connector

Once the trunk bus 130 is installed, the solar panel arrays 110 can be connected to the trunk bus 130 using multi-tap penetrating connectors 210, such as the shear-bolt connectors shown in FIGS. 10, 11, 12, and 13A & 13B. The connectors 210 are disposed about the trunk bus 130 lines and include a plurality of taps 212 for receiving portions of the PV wire harnesses 114. The multi-tap shear bolt connectors 210 show favorable temperature performance under high current conditions, and importantly, the connectors 210 obviate the need for combiner boxes that are prone to overheating and failure.

The connectors 210 include a hollow body portion (e.g., a housing 214) with one or more socket openings 218 defining the interior of the housing, or socket. The socket is configured to accommodate and firmly secure the end portion of one or more conductors, such as the positive trunk bus line 134 or the negative trunk bus line 136. The socket may define a channel through the housing 214, or the socket can be formed from halves or shells of the connector housing 214 joined to form a channel.

Conductors (e.g., the positive and negative trunk bus lines 134 & 136) are secured within the socket by shear bolt fasteners 220 that extend through passages 215 in the connector housing 214 to penetrate through the conductor insulation and into the interior of the conductor material. In this manner, the fasteners 220 establish metal-to-metal conductive contact between the conductor interior and the connector housing 214.

The head 222 of the shear-bolt fasteners 220, and in some cases part of the stem 224, is designed to shear off when the fasteners 220 are subjected to a predetermined torsion load. At least a portion of the shear-bolt stem 224 remains within the passage 215 after shearing. Preferably, the fastener 220 shears such that the stem 224 does not extend beyond the exterior surface of the connector housing 214. Notably, the connector 210 is not limited to a shear bolt connector, and the taps 212 can likewise be formed in other types of connectors and used to support the bus systems disclosed herein.

The solar panel arrays 110 are placed in electrical communication with the multi-tap connector 210 and trunk bus 130 by inserting portions of the wire harnesses 214 into the connector taps 212. In particular, insulation is stripped from a portion of photovoltaic wire extending from the wire harness 214, and the exposed photovoltaic wire is placed within the tap 212 and held in place with a set screw (not shown). This places the photovoltaic wire harness 114 in electrical communication with the connector housing 214 and the conductor within the socket (i.e., the positive or negative trunk bus line 134 & 136).

The example multi-tap shear bolt connector 210 embodiment shown in the attached Figures allows four panel arrays 110 to connect to an initial feeder bus line or a trunk bus line 130, which increases the number of connection points on a bus line compared to use of combiner boxes. Increasing the number of connection points avoids the substantial heat generation that occurs at combiner boxes that might otherwise accept input from tens of panel arrays 110.

Figure 13A:
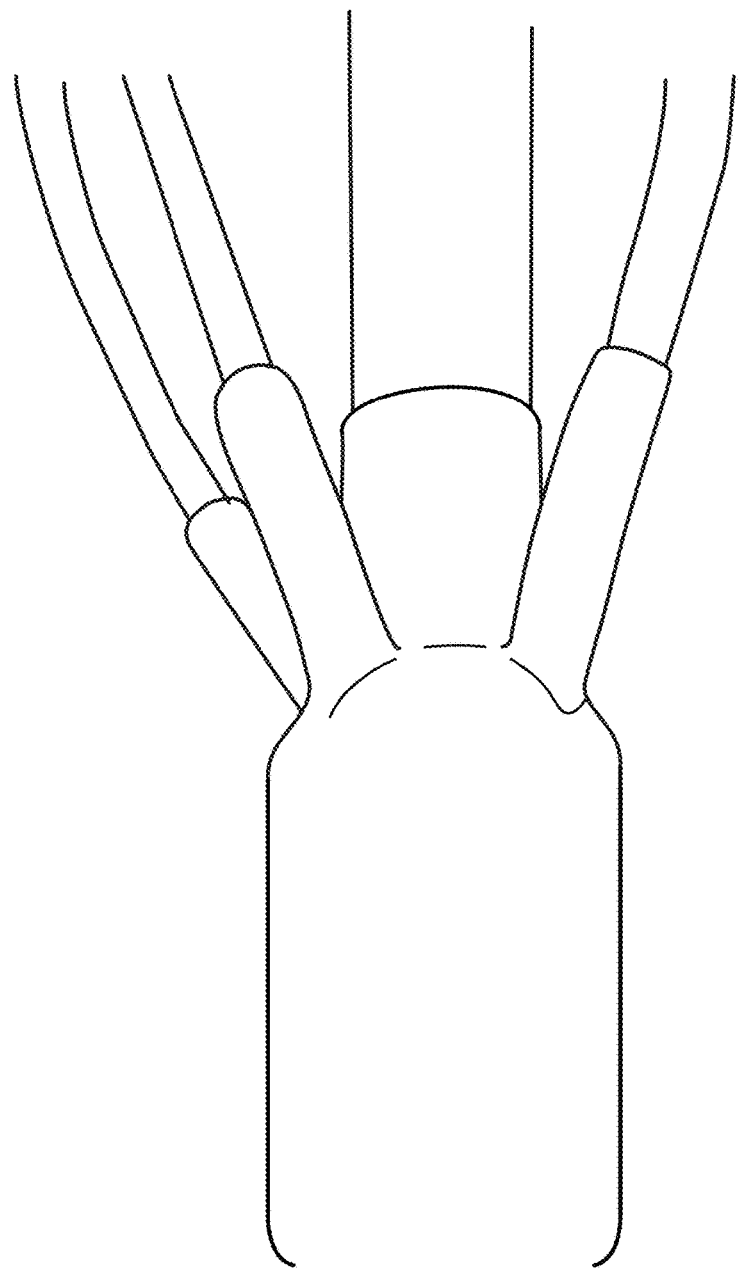
FIG. 13A is an example heat-shrink boot encapsulating a multi-tap connector according to one embodiment.
Figure 13B:
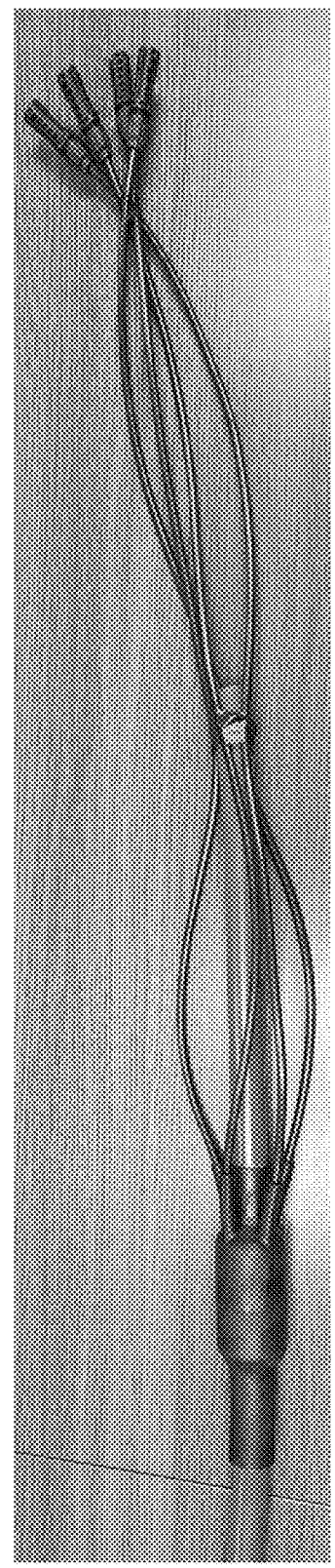
FIG. 13B is an example heat-shrink boot encapsulating a multi-tap connector according to one embodiment.

Once the multi-tap connector 210 is installed on a bus line, it can be sealed with an insulating material to provide mechanical support, electrical isolation, and protection from moisture (i.e., "ingress protection) or other weather elements. The sealing can be accomplished prior to field installation using, for example, a molded thermoplastic elastomer, a molded thermoset elastomer, or a heat-shrink boot that encapsulates the connector 210. An example of a heat-shrink boot encapsulating the connector 210 is depicted in FIGS. 13A and 13B where FIG. 13B illustrates the insulation partially covering four conductors (e.g., photovoltaic wires) extending from the taps of the multi-tap connector.

In other embodiments, the connector 210 can be provided with a sealing kit adapted for field use and installation. The field sealing kit can include an insulating sleeve, a tape, or a semi-solid paste or gel that is applied to the connector and heat-dried to shrink or conform the insulating material to the connector 210. The insulating material can be a cross-linked polyethylene or another suitable insulating polymer material. The connection can also be sealed utilizing a factory-installed heat shrink polyolefin boot that is custom designed to encapsulate the connector body and the taps 212, as shown in FIGS. 13A and 13B.

Multi-Tap Connector Experimental Results

Temperature cycle testing was performed on the above-described the multi-tap shear bolt connector. The connector embodiment tested was sized at 1,000 kilo-circular mils ("kcmil") and designed to accommodate a current of 200 A. The taps were sized to receive 8 American Wire Gauge ("AWG") conductors and rated to handle current loads of approximately 40 A per tap. This sizing ensures the individual taps are well suited to receive photovoltaic wire coming from the solar panel arrays that typically carry currents between 6 A to 10 A per array under routine field operating conditions.

The first test, Test 1, was conducted on a 1,000 kcmil connector with four shear bolts and a full connector with eight shear bolts. Test 1 utilized two pieces of 750 kcmil aluminum cable coupled at one end to the connector and coupled at the other end to a current source. No photovoltaic cables were inserted into taps on the connectors. Current was first applied at 400 A and increased 50 A every eight hours until reaching a maximum current of 580 A. The currently was applied over the course of a week with the current turned on during the day and off at night to simulate real-world solar field current generating conditions.

Figure 14:
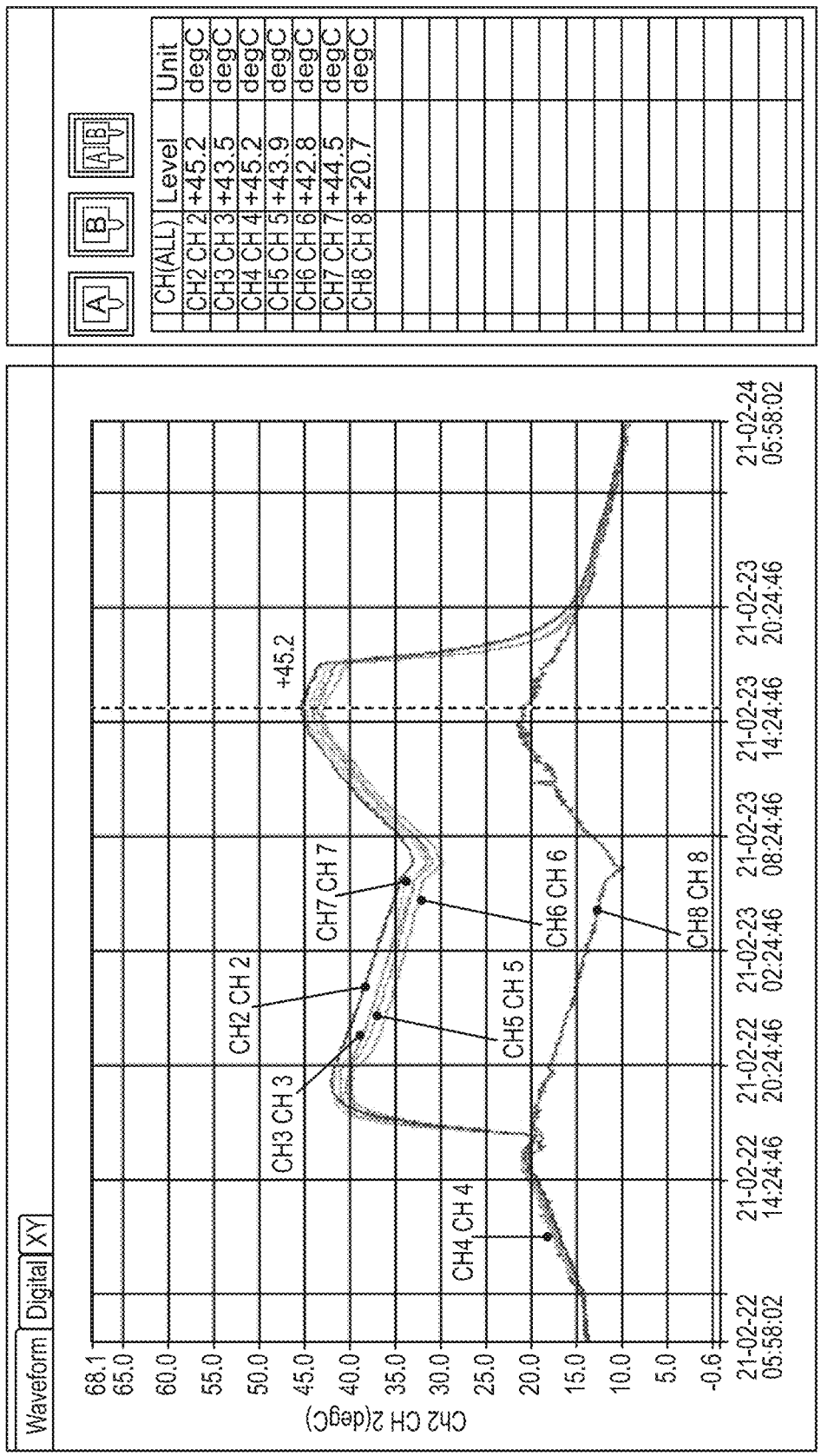
FIG. 14 illustrates temperature cycling test results of a connector.

Thermocouples were placed at various locations on the connector and conductors to measure temperature. The temperature readings are shown in FIG. 14 where the channel readings are as follows: (1) CH2—inside the connector close to a shear bolt; (2) CH3—on the insulation of a 750 kcmil cable close to the connector; (3) on the conductive material of a 750 kcmil cable by inserting the thermocouple through a cut on the cable; (4) CH5, CH6, and CH7 at the same locations as (1) to (3) on the full connector; and (5) CH8 as the ambient temperature. The experimental results are reflected in FIG. 14 and show a maximum temperature of 45.2 degrees Celsius (° C.).

Figure 15:
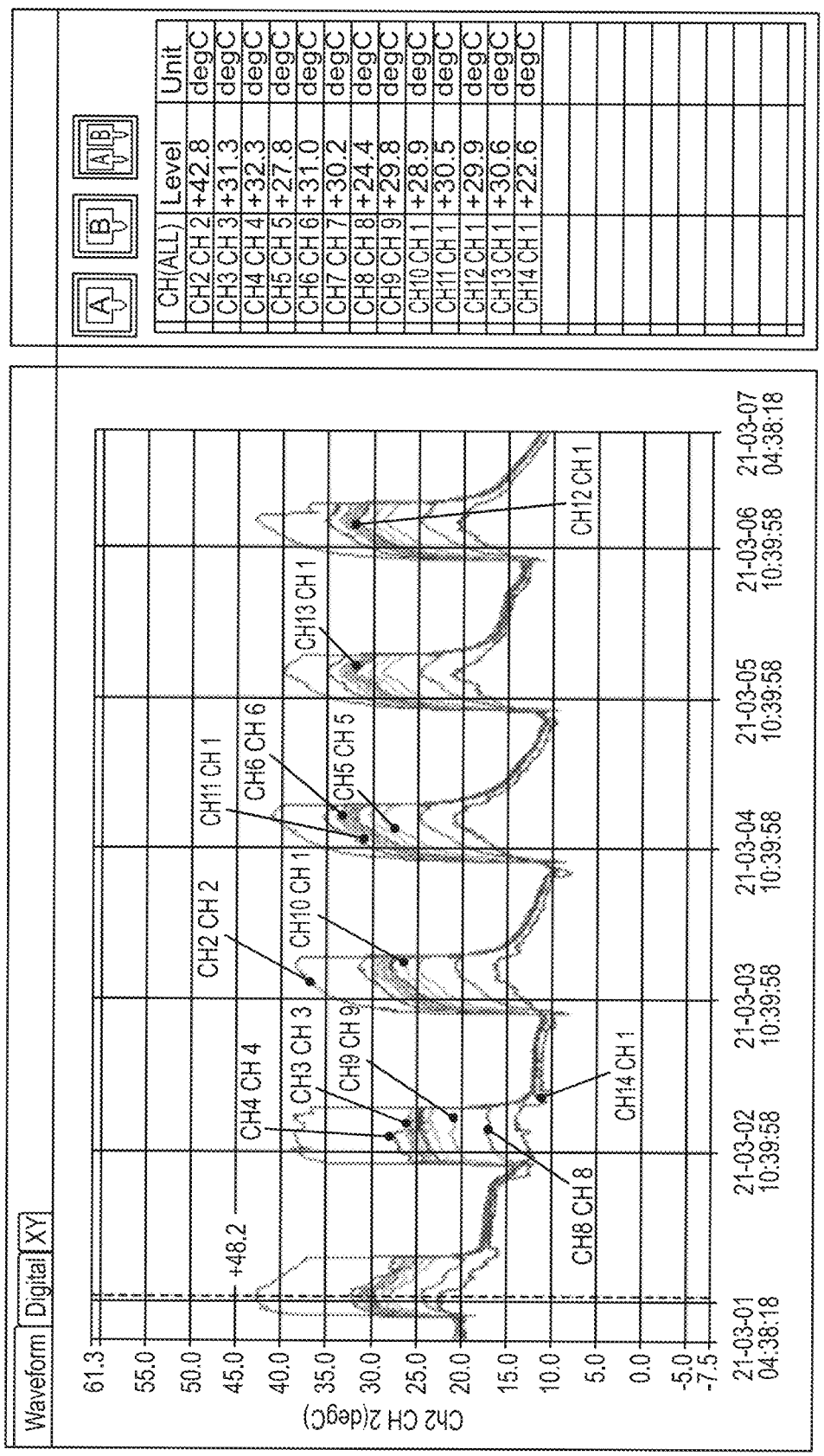
FIG. 15 illustrates temperature cycling test results of a multi-tap connector according to one embodiment.

A second experiment, Test 2, was conducted using a full 1,000 kcmil connector with four taps connected to 8 AWG photovoltaic wires of equal length. Current was run through the 8 AWG photovoltaic wires with no 750 kcmil conductor cable inside of the connector socket. During temperature cycling, the connector was subjected to a 240 A current during the day with the current being removed at night to simulate real-world solar power generation cycling conditions. The current was assumed to be evenly distributed among the four taps at 60 A per tap. The current was delivered through 8 AWG wire secured to each tap. The temperature curves are shown in FIG. 15 where each curve represents the temperature at a different location on the connector and conductors.

Temperature was measuring using thermocouples affixed to various locations on the connector and the conductors. With reference to FIG. 15, temperatures at the four taps are represented by curves CH2, CH5, CH8, and CH11. The temperature was also measured at the top of the 8 AWG wire insulation close to the connector as represented by curves CH3, CH6, CH9, and CH12. Temperature was further measured on the actual conductor material of the 8 AWG wires by inserting a thermocouple through a slit in the insulation, and conductor temperature is represented by curves CH4, CH7, CH10, and CH13. The ambient temperature is represented by curve CH14.

The experimental test results showed that the multi-tap shear bolt connector was able to conduct electric current without excessive temperature rise. The highest temperature at one of the 8 AWG inputs was approximately 32.3 degrees Celsius (° C.) when the ambient temperature was 22.6° C.

Lastly, a third experiment, Test 3, was conducted by applying a current to the 750 kcmil aluminum photovoltaic conductor cable housed within a connector socket and the four 8 AWG photovoltaic wires secured within the connector taps. Test 3 began with 60 A applied to each of the 8 AWG photovoltaic wires and a current of 505 A applied to the 750 kcmil conductor cable. Current was increased on the 8 AWG photovoltaic wires to 70 A and increased to 590 A on the 750 kcmil conductor cable.

Thermocouples were used to measure the temperature at various locations with the corresponding temperature readings shown in FIG. 14 as follows: (1) CH2—measured at a connection point of one of the 8 AWG photovoltaic wires and the connector; (2) CH3—on the conductive material of the 8 AWG photovoltaic wire by inserting a thermocouple through a cut in the wire insulation; (3) CH4—on top of the 750 kcmil conductor cable insulation close to the connector; (4) CH5—on the surface of the connector near the shear bolts; (5) CH6—on the conductive material of the positive current 750 kcmil cable by inserting a thermocouple through a cut in the wire insulation; (6) CH7—on the insulation of the positive side of the 750 kcmil cable near location CH6; (7) CH8—on the conductive material of the negative side of the 750 kcmil cable by inserting a thermocouple through a cut in the wire insulation; (8) CH9—on the insulation of the negative side of the 750 kcmil cable near location CH8; and (9) CH10—the ambient temperature.

Figure 16:
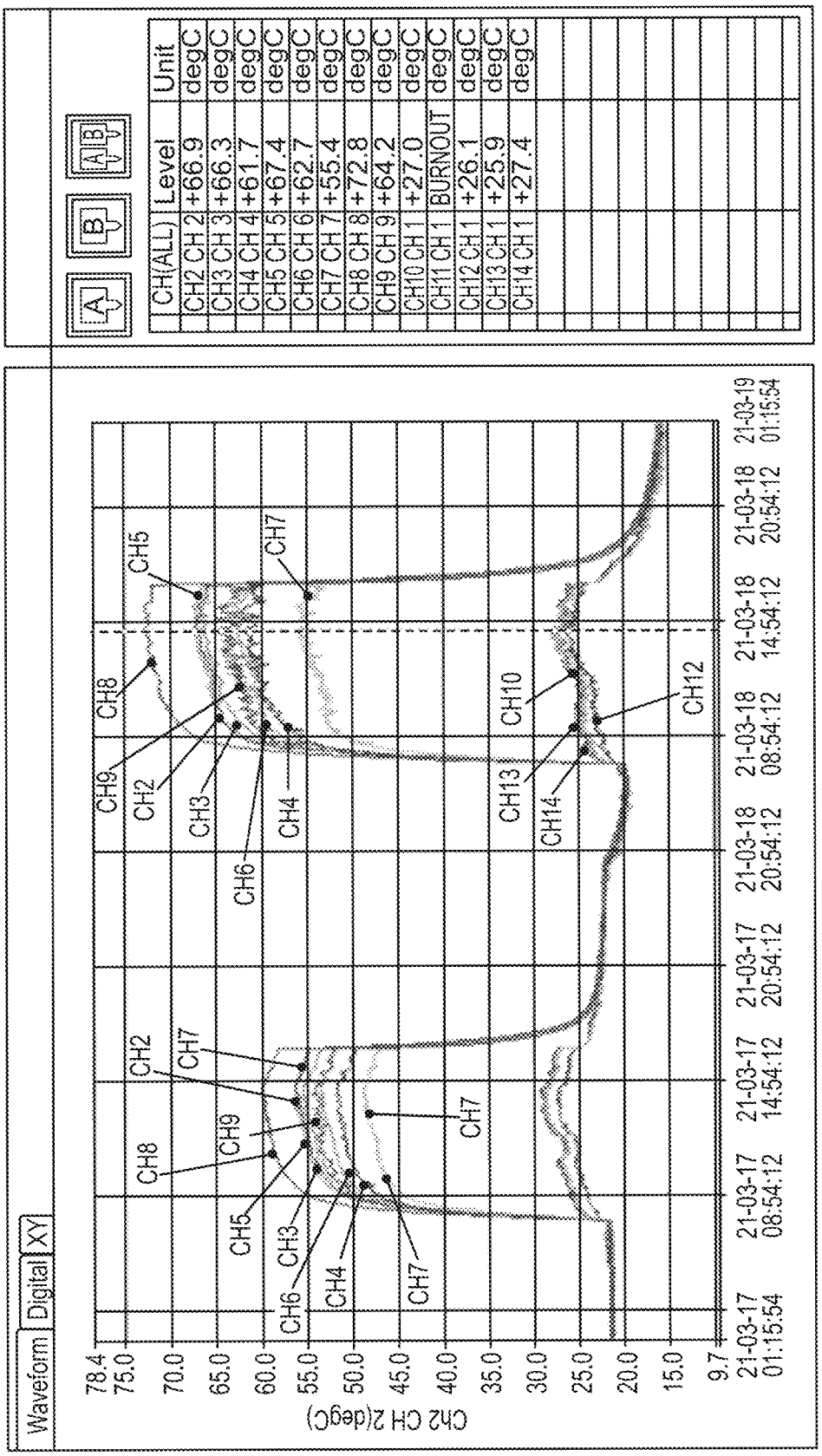
FIG. 16 illustrates temperature cycling test results of a multi-tap connector according to one embodiment.

FIG. 16 depicts the experimental results for the high current conditions of Test 3. The highest temperature was 72.8° C. at the 750 kcmil conductor cable when the ambient temperature was 27.4° C. The 8 AWG photovoltaic wires showed stable temperature performance and stayed below 30° C. All measured temperatures stayed below 90° C. indicating that the connector could maintain performance without heat failure under high current conditions.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. An electrical bus system comprising:
(a) a power generation unit;
(b) a trunk bus that comprises (i) a positive bus line, (ii) a negative bus line, and (iii) a messenger cable;
(c) a bracket fixed to a vertical support, wherein the trunk bus is secured to the bracket;
(d) a multi-tap connector formed from a conductive material, wherein the multi-tap connector that comprises
   (i) a housing formed as an elongated hollow body having an exterior surface, a first opening, a second opening, and a socket extending from the first opening to the second opening, wherein the trunk bus extends through the socket from the first opening to the second opening,
   (ii) a passage extending from the exterior surface through to the socket,
   (iii) a fastener housed within the passage, wherein the fastener frictionally engages the trunk bus within the socket,
   (iv) a plurality of taps that are each formed as a conduit extending through the housing to the socket, and
   (v) a conductor line housed within each of the plurality of taps, wherein the conductor line is electrically connected to the electrical power generation unit and the trunk bus.

2. The electrical bus system of claim 1, wherein:
(a) the power generation unit is a solar panel array; and
(b) the conductor line is a photovoltaic wire.

3. The electrical bus system of claim 1, wherein the positive bus line, the negative bus line, and the messenger cable are twisted together along a length of the positive bus line, the negative bus line, and the messenger cable.

4. The electrical bus system of claim 1, wherein:
(a) the bracket comprises a head, a neck, a planar body, and an aperture;
(b) the head and the neck extend through a slot in the vertical support; and
(c) the trunk bus is secured to the bracket.

5. The electrical bus system of claim 1, wherein:
(a) the bracket comprises a notch; and
(b) the messenger cable runs through the notch of the bracket to secure the trunk bus to the vertical support.

6. The electrical bus system of claim 1, wherein:
(a) the trunk bus is in signal communication with the bracket fixed to the vertical support; and
(b) the bracket and the vertical support are made from a conductive material such that the integrated trunk bus is connected to ground through the bracket and the vertical support.

7. The electrical bus system of claim 1, wherein the fastener is a shear bolt.

8. The electrical bus system of claim 1, wherein:
(a) the connector is at least partially encased within an insulating material; and
(b) the insulating material is a molded thermoplastic elastomer disposed on the connector by heat shrinking.

9. The electrical bus system of claim 1, wherein the positive trunk bus line and the negative trunk bus line comprise
(a) a conductive cable at least partially covered by a first insulating layer, wherein the first insulating layer comprises a cross-linked polyethylene material; and
(b) a second insulating layer at least partially covering the first insulating layer, wherein the second insulating layer comprises a high-density polyethylene material.

10. The electrical bus system of claim 9, wherein:
(a) the first insulating layer is non-colored and has a thickness between 5 mils to 15 mils; and
(b) the second insulating layer has a thickness between 20 mils to 30 mils.

11. An electrical bus system comprising:
(a) a plurality of vertical supports arranged in a row, wherein each vertical support is proximal to at least one power generation unit;
(b) an integrated trunk bus comprising a length that extends between the vertical supports, wherein the integrated trunk bus comprises a positive bus line, a negative bus line, and a messenger cable that are all are twisted together along the length;
(c) a bracket fixed to each of the vertical supports, wherein the integrated trunk bus is secured to the bracket at each vertical support; and
(d) a connector that comprises
   (i) a housing having an exterior surface, a first opening, a second opening, and a socket extending from the first opening to the second opening, wherein the integrated trunk bus extends through the socket from the first opening to the second opening,
   (ii) a plurality of passages that each extend from the exterior surface through the housing to the socket,
   (iii) a conductive fastener housed within the passage, wherein the conductive fastener frictionally engages the integrated trunk bus within the socket, and wherein the integrated trunk bus is in signal communication with the connector, through the conductive fastener,
   (iv) a plurality of taps that are each formed as a conduit that extends through the housing to the socket, and
   (v) a conductor line housed within each of the plurality of taps, wherein each conductor line is in signal communication with (A) at least one of the electrical power generation units, and (B) the integrated trunk bus.

12. The electrical bus system of claim 11, wherein:
(a) each of the power generation units comprises a plurality of solar panel arrays;
(b) the plurality of solar panel arrays are in signal communication with a photovoltaic wire harness through photovoltaic wires; and (c) the conductor lines are connected to the photovoltaic harness thereby placing the conductor lines in signal communication with the plurality of solar panel arrays.

13. The electrical bus system of claim 12, wherein the connector comprises four taps.

14. The electrical bus system of claim 13, wherein the conductive fastener is a shear bolt.

15. The electrical bus system of claim 11, wherein:
(a) the bracket comprises a head, a neck, a planar body, and an aperture;
(b) the head and the neck extend through a slot in the vertical support; and
(c) the integrated trunk bus is secured to the bracket by a fastener installed in the aperture.

16. The electrical bus system of claim 11, wherein the positive trunk bus line and the negative trunk bus line comprise
(a) a conductive cable at least partially covered by a first insulating layer, wherein the first insulating layer comprises a non-colored, cross-linked polyethylene material; and
(b) a second insulating layer at least partially covering the first insulating layer, wherein the second insulating layer comprises a high-density polyethylene material.

17. The electrical bus system of claim 11, wherein the integrated trunk bus is disposed on a reel and unspooled before being fixed to each of the vertical supports.

18. The electrical bus system of claim 11, wherein:
(a) the integrated trunk bus is in signal communication with the bracket fixed to each vertical support; and
(b) the brackets and the vertical supports are made from a conductive material such that the integrated trunk bus is connected to ground through the bracket and the vertical support.

19. A method for installing an electrical bus system comprising the steps of:
(a) providing a plurality of vertical supports extending upward from the ground, wherein each vertical support includes a slot formed therein;
(b) providing plurality of brackets that each comprise a head and a planar body with a top surface and a bottom surface;
(c) connecting one of the plurality of brackets to each of the vertical supports by
(i) rotating the bracket so that the head is aligned with the slot,
(ii) inserting the head through the slot, and
(iii) rotating the bracket so that the planar body top side and bottom side are approximately parallel to the ground;
(d) creating an integrated trunk bus by braiding together a positive trunk bus line, a negative trunk bus line, and a messenger cable;
(e) spooling the integrated trunk bus about a reel;
(f) connecting the integrated trunk bus to the plurality of vertical supports by
(i) unspooling the integrated trunk bus from the reel,
(ii) frictionally engaging the integrated trunk bus to each bracket, and
(iii) securing the integrated trunk bus to the bracket;
(g) running the integrated trunk bus through the housing of a conductive connector;
(h) securing the conductive connector to the integrated trunk bus by running a conductive fastener through the conductive connector housing to frictionally engage the integrated trunk bus; and
(i) placing the conductive connector in signal communication with a plurality of power generation units through a plurality of conductor lines that extend from each of a plurality of taps formed in the connector housing.

20. The method for installing an electrical bus system of claim 19, wherein the plurality of power generation units are solar arrays.

* * * * *